US011930920B1

(12) United States Patent
Moore et al.

(10) Patent No.: US 11,930,920 B1
(45) Date of Patent: Mar. 19, 2024

(54) SIDE MOUNT TABLE LEG ASSEMBLY

(71) Applicant: Whitecap Industries, Inc., Piscataway, NJ (US)

(72) Inventors: Todd Moore, St. Paul, MN (US); Christopher E. Tomao, Robbinsville, NJ (US)

(73) Assignee: Whitecap Industries, Inc., Piscataway, NJ (US)

( * ) Notice: Subject to any disclaimer, the term of this patent is extended or adjusted under 35 U.S.C. 154(b) by 0 days.

(21) Appl. No.: 17/952,461

(22) Filed: Sep. 26, 2022

(51) Int. Cl.
*A47B 3/08* (2006.01)
*A47B 3/00* (2006.01)

(52) U.S. Cl.
CPC ............ *A47B 3/0803* (2013.01); *A47B 3/002* (2013.01)

(58) Field of Classification Search
CPC ......... A47B 3/0803; A47B 3/002; A47B 3/12; A47B 5/006; A47B 5/02; A47B 9/00; A47B 2200/0042
See application file for complete search history.

(56) References Cited

U.S. PATENT DOCUMENTS

| | | | |
|---|---|---|---|
| 1,063,220 A | 6/1913 | Seamon | |
| 3,069,543 A | 12/1962 | Sazavsky | |
| 3,427,667 A | 2/1969 | Ratcliff | |
| 4,672,898 A | 6/1987 | Davidson | |
| 4,995,322 A | 2/1991 | Frederick | |
| 5,370,570 A * | 12/1994 | Harris | A63H 33/006 248/104 |
| 5,673,628 A * | 10/1997 | Boos | G06F 1/1632 108/138 |
| 5,727,478 A | 3/1998 | Rahn et al. | |
| 5,964,439 A * | 10/1999 | Johnson | A61G 5/10 248/278.1 |
| 6,209,835 B1 | 4/2001 | Walrath et al. | |
| 6,896,231 B1 | 5/2005 | Sullivan | |
| 7,367,740 B2 * | 5/2008 | Lazic | F16M 11/12 403/103 |
| 8,359,982 B2 * | 1/2013 | Lebel | A47B 3/00 108/7 |
| 8,973,878 B2 | 3/2015 | Thompson | |

(Continued)

FOREIGN PATENT DOCUMENTS

| | | |
|---|---|---|
| CN | 110403359 A | 11/2019 |
| ES | 2478390 A1 | 7/2014 |
| WO | 9413362 A1 | 6/1994 |

OTHER PUBLICATIONS

"Adjustable boat table pedestal S2000," https://www.nauticexpo.com/prod/forma-marine-furniture-llc/product-23594-193428.html, 5 pages, Retrieved May 13, 2021.

(Continued)

*Primary Examiner* — Daniel J Rohrhoff
(74) *Attorney, Agent, or Firm* — Servilla Whitney LLC

(57) ABSTRACT

A side mount table leg assembly that is height adjustable to a plurality of heights is disclosed. The table leg assembly comprises an upper leg, a lower leg and a first and a second pivotable connection. The table leg assembly further comprises a side mount adapter configured to be slidably and removably engaged with a mounting bracket that is mountable to a non-horizontal surface. A gear plate at the second pivotable connection is configured to adjust the table leg assembly in three rotatable positions to accommodate different draft angles.

20 Claims, 10 Drawing Sheets

(56) References Cited

U.S. PATENT DOCUMENTS

| | | | | |
|---|---|---|---|---|
| 9,133,982 B1* | 9/2015 | Valdez | ................. | F16M 13/022 |
| 9,140,406 B2* | 9/2015 | Simon | ................... | F16M 11/105 |
| 9,527,456 B2* | 12/2016 | Ackeret | ............. | B60R 11/0241 |
| 10,196,120 B2* | 2/2019 | Turek | ....................... | F21V 21/14 |
| 11,737,554 B2* | 8/2023 | Moore | ..................... | A47B 9/16 |
| | | | | 108/50.02 |
| 2002/0017495 A1 | 2/2002 | Izuka et al. | | |
| 2007/0157856 A1 | 7/2007 | Skoog et al. | | |
| 2007/0164176 A1* | 7/2007 | Liao | ....................... | F16M 13/02 |
| | | | | 248/176.3 |
| 2010/0259877 A1* | 10/2010 | Johnson | ................. | F16M 11/24 |
| | | | | 361/679.02 |
| 2014/0226281 A1* | 8/2014 | Emami | .................. | F16M 11/26 |
| | | | | 248/124.2 |
| 2020/0023761 A1* | 1/2020 | Nishimura | ............... | A47B 9/00 |
| 2020/0345132 A1 | 11/2020 | White et al. | | |
| 2023/0086318 A1 | 3/2023 | Moore et al. | | |

OTHER PUBLICATIONS

"Garelick Side Mount Coaming Table Leg System," https://www.iboats.com/shop/garelick-side-mount-coaming-table-leg-system.html, 3 pages, Retrieved Jul. 21, 2021.

"Height Adjustable Single Gas Spring Laptop Arm Mount Support 12-17.3 inch Laptop/Notebook," https://www.amazon.com/gp/product/B085DVG13T/ref=ox_sc_saved_title_1?smid=A3T8D68MUA8DQ1&psc=1, 5 pages, Retrieved Jul. 21, 2021.

"Removable Side Mount Table Support Arm," https://tacomarine.com/table-pedestals-removable-side-mount-table-pedestal-system-f16-0005a, 3 pages, Retrieved Jul. 21, 2021.

Non-Final Office Action in U.S. Appl. No. 17/480,670, dated Mar. 14, 2023, 15 pages.

* cited by examiner

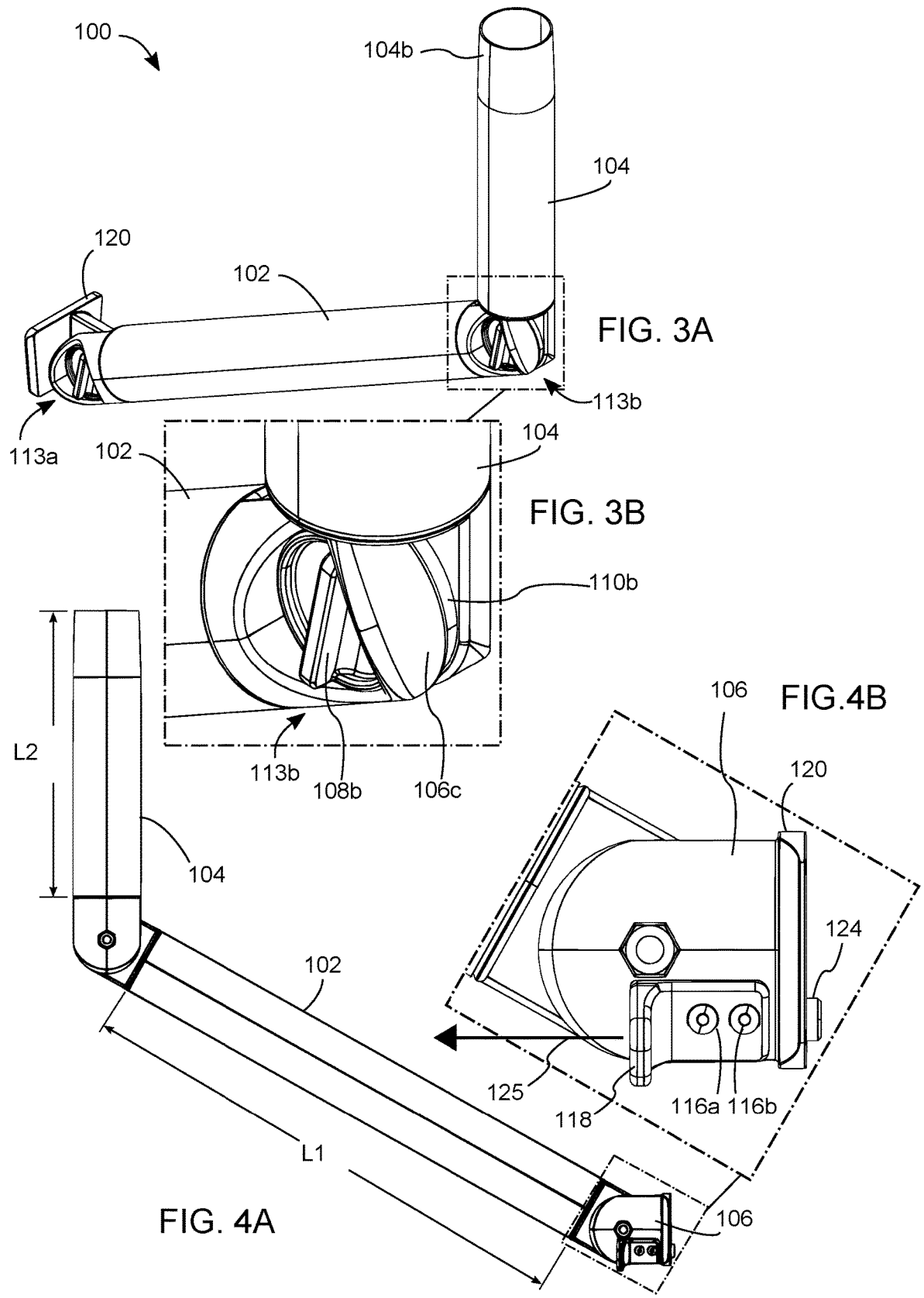

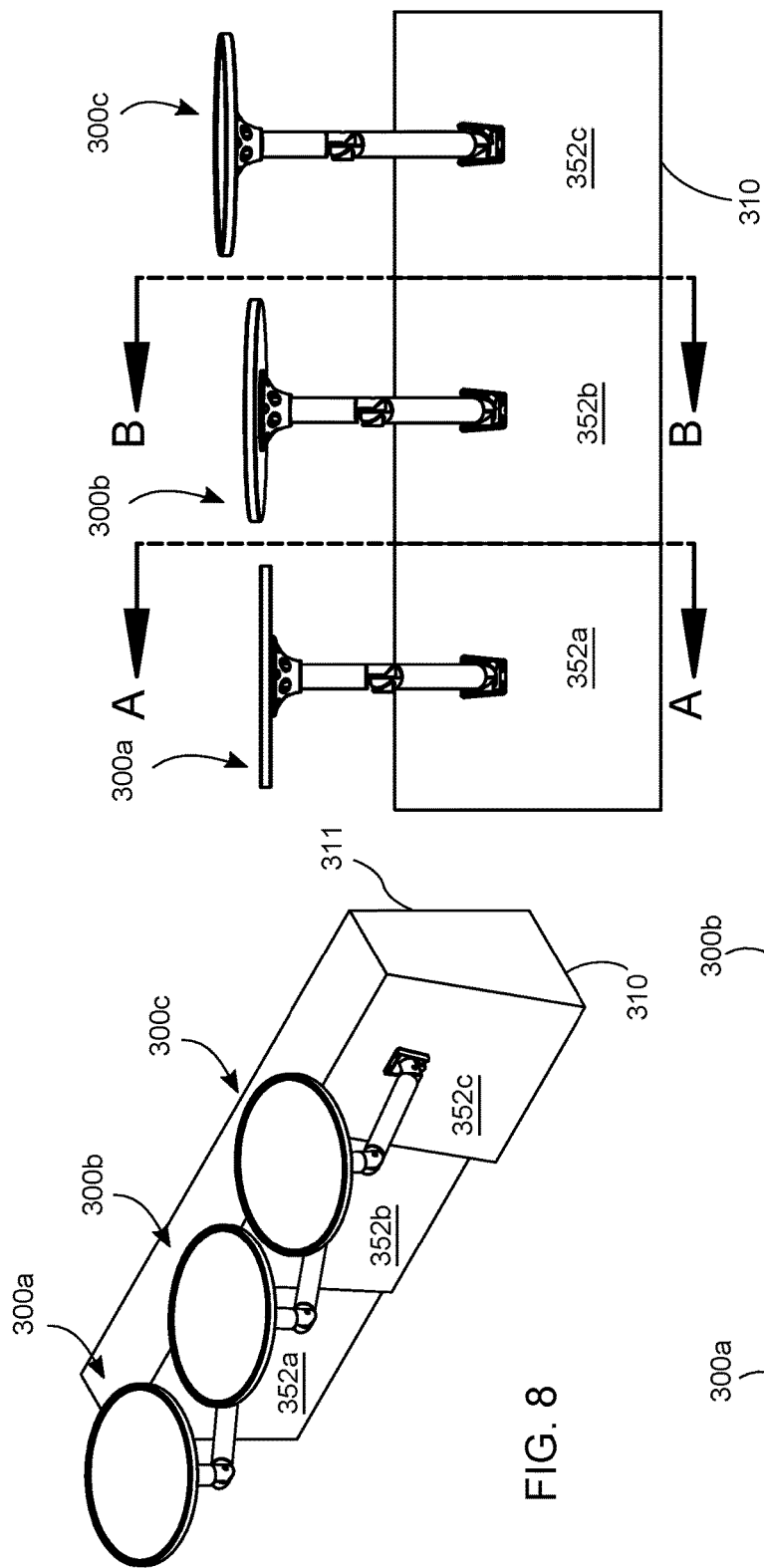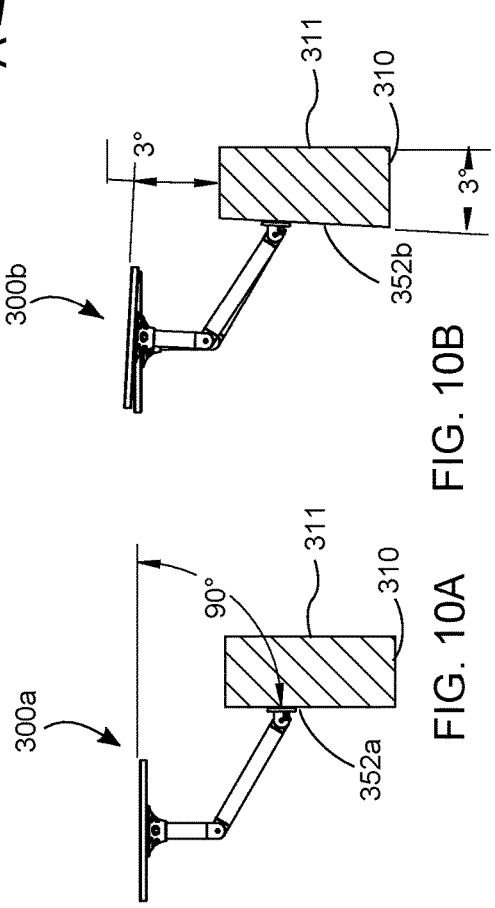

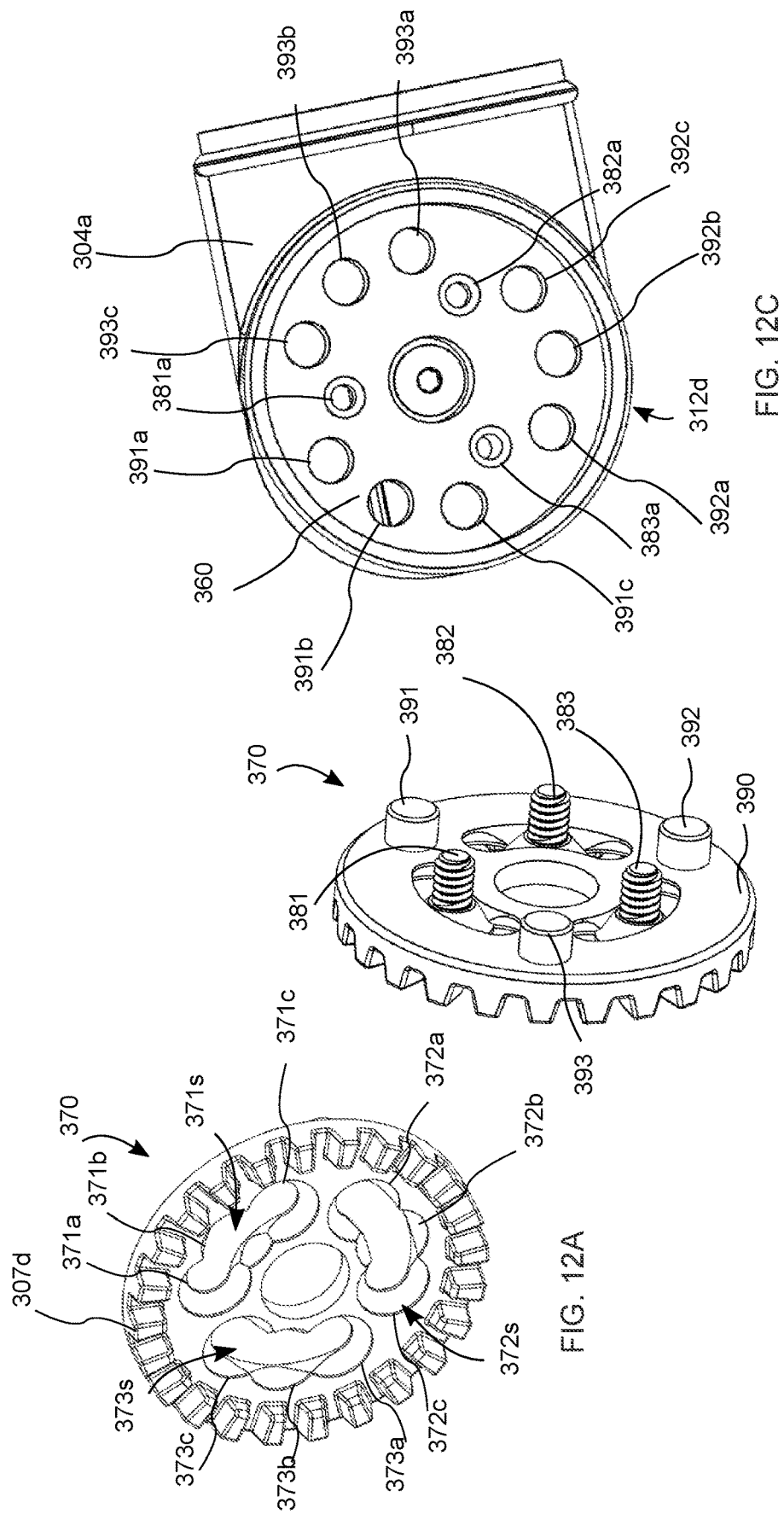

SIDE MOUNT TABLE LEG ASSEMBLY

TECHNICAL FIELD

The present disclosure relates generally to table leg assemblies, and in particular, table leg assemblies that can be side mounted and are height adjustable to a variety of heights and angles so that the table is parallel to a horizontal plane, such as a floor or a deck of a boat.

BACKGROUND

In recreational vehicles such as boats and motorhomes, and in microhomes (homes less than 400 square feet), side mount tables can be used in a variety of locations. For example, in a recreational boat having a bow-riding area and/or a stern swim platform, side mount tables may be mounted to a non-horizontal surface, allowing users to use the table for dining, drinks or as a work surface. In larger boats, including larger bow rider boats, yachts, pontoon boats and party boats, it may be desirable to mount a side mount table in a mid-section area of the boat between the bow and the stern, such as a lounge area or dining area. In a motorhome or a microhome, where space is at a premium, such side mount tables can be mounted in a kitchen, a dining area, a front porch or a back deck.

Existing side mount table legs generally include a unitary angled table leg with a first end mounted to the table, and a second end that connects to a side mount bracket. An example of such a side mount table is the removable side mount table support arm available from Taco Marine of Miami, Florida and available at (https://tacomarine.com/table-pedestals-removable-side-mount-table-pedestal-system-f16-0005a). Referring to FIGS. 1A and 1B, such an existing side mount table leg is shown as comprising a unitary leg 52 comprising a bend 54. A first end 52a of the unitary table leg 50 is affixable to a table by a table mount 56, and a second end 52b of the unitary table leg 50 is mountable to a bracket 58, and a set screw 59 affixes the table leg second end 52b to the bracket to prevent the table leg 60 from inadvertently or accidentally disconnecting from or falling out of the bracket 58. For example, when the side mount table leg is mounted to a non-horizontal surface of a boat, when a boat is moving and encounters wake or waves, bouncing of the boat hull on the wake or waves could cause the table leg to dismount from the bracket 58.

While existing side mount table legs provide a way to mount a table to a non-horizontal surface, these existing designs have several disadvantages and limitations, and there remains a need for improved side mount table legs.

SUMMARY

One or more embodiments of the disclosure are directed to a side mount table leg assembly comprising a lower leg comprising a first pivotally connectable end, the first pivotally connectable end connected to a side mount adapter by a first pivotable connection, and a second pivotally connectable end connected by a second pivotable connection to a first pivotally connectable end of an upper leg, and a second end of the upper leg connectable to a bottom surface of a table; a mounting bracket attachable to a non-horizontal surface, the side mount adapter configured to be slidably and removably engaged with the mounting bracket, the first pivotable connection and the second pivotable connection configured to permit the second end of the upper leg to be adjusted from a first, fully extended height, to a plurality of intermediate heights, and a lower height; and a plurality of gear teeth configured to securely hold the table leg assembly in at least a first angular position and a second angular position.

In another aspect, one or more embodiments are directed to a side mount table assembly comprising a leg assembly including a lower leg comprising a first pivotally connectable end, the first pivotally connectable end connected to a side mount adapter by a first pivotable connection, and a second pivotally connectable end connected by a second pivotable connection to a first pivotally connectable end of an upper leg, and a second end of the upper leg connected to a bottom surface of a table; and a mounting bracket attachable to a non-horizontal surface, the side mount adapter configured to be slidably and removably engaged with the mounting bracket, the first pivotable connection and the second pivotable connection configured to permit the second end of the upper leg to be adjusted from a first, fully extended height, to a plurality of intermediate heights, and a lower height.

Another aspect of the disclosure pertains to a method of using a table including a table leg assembly, the method comprising slidably engaging a side mount adapter connected to a first pivotally connectable end of a lower leg of the table leg assembly by a first pivotable connection with a side-mounted mounting bracket; pivoting a second pivotable connection connecting a second pivotally connectable end of the lower leg to a first pivotally connectable end of an upper leg to adjust a height of a table connected to a second end of the upper leg to allow a user of the table assembly to use the table as a coffee table, a dining table, a worktable and a bar table; and adjusting the table to be level with a deck of a boat by rotating a gear plate at the second pivotable connection.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is a side perspective view of the side mount table leg assembly shown in FIG. 1A in an assembled configuration;

FIG. 3B is an enlarged side isometric view of a portion of the side mount table leg assembly shown in FIG. 3A;

FIG. 4A is a side view of the opposite side of the side mount table leg assembly shown in FIG. 3A;

FIG. 4B is an enlarged side view of a portion of the side mount table mount assembly shown in FIG. 4A;

FIG. 8 is a perspective view of a table assembly including a table leg assembly at different draft angles according to one or more embodiments;

FIG. 9 is a front view of the table assembly shown in FIG. 8;

FIG. 10A is a cross-sectional view taken along line A-A of FIG. 10;

FIG. 10B is a cross-sectional view taken along line B-B of FIG. 10

FIG. 12A is a front perspective view of a rotatable gear plate according to one of more embodiments of the table leg assembly of FIG. 11;

FIG. 12B is rear perspective view of a rotatable gear plate according to one or more embodiments of the table leg assembly of FIG. 11;

FIG. 12C is a front view of a first pivotally connectable end of an upper leg of the table leg assembly of FIG. 11;

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

The term "horizontal" as used herein is defined as a plane parallel to the plane or surface of a floor, a deck or a deck of a boat, regardless of its orientation. The term "vertical" refers to a direction perpendicular to the horizontal as just defined. The term "non-horizontal" includes planes that are at 20 degrees to 120 degrees from a horizontal plan, including, but not limited to vertical. The phrases "side mount" and "side mounted" refer to a table leg that is affixed to a non-horizontal surface of a room, a deck, a vehicle, a boat or a motorhome. For example, a side mounted or side mount table leg assembly is not affixed to the deck or gunwale of a boat, but instead is affixed to a sidewall surface of a boat such as a wall, a coaming or other non-horizontal surface. Terms, such as "above", "below", "bottom", "top", "side" (as in "sidewall"), "higher", "lower", "upper", "over", and "under", are defined with respect to the horizontal surface as shown in the figures.

The term "on" indicates that there is direct contact between elements. The term "directly on" indicates that there is direct contact between elements with no intervening elements.

Figure 1A:
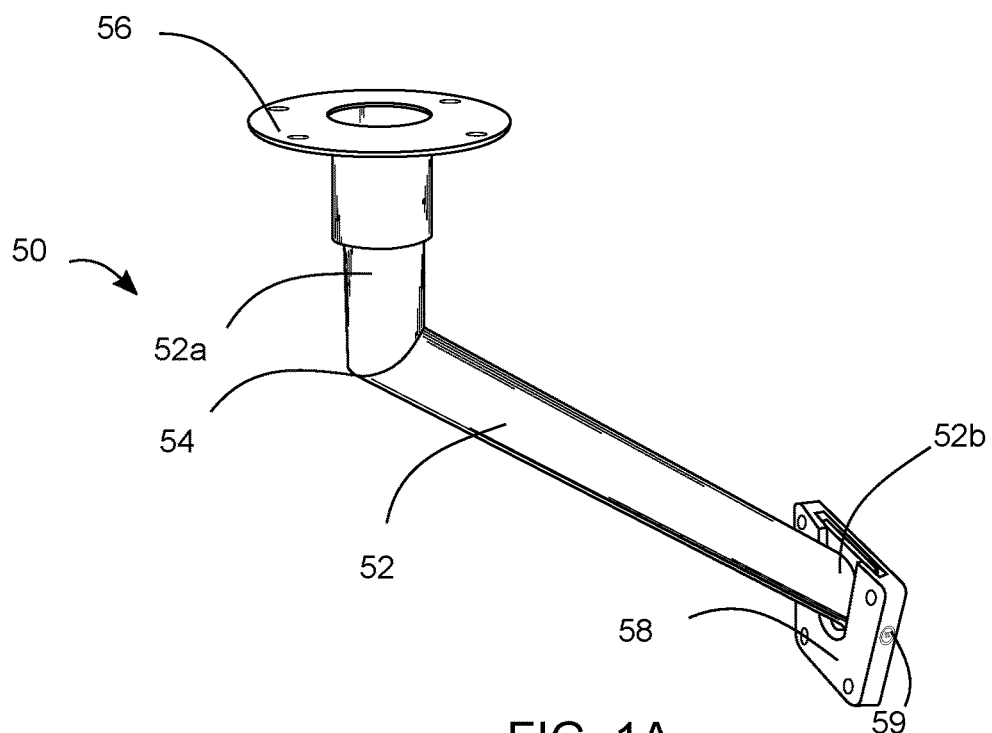
FIG. 1A is a side isometric view of a prior art side mount table assembly.
Figure 1B:
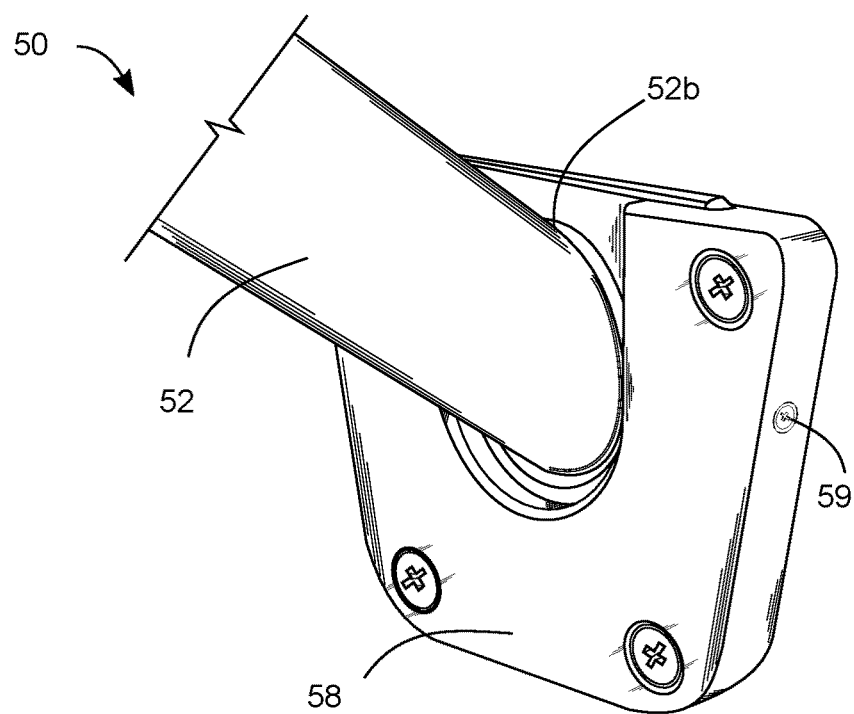
FIG. 1B an enlarged side isometric view of a portion of the prior art side mount table assembly shown in FIG. 1A.

Existing side mount table legs have several limitations and disadvantages. Referring to FIG. 1A and FIG. 1B, the existing side mount table leg requires a set screw and tools to mount and unmount the table leg from the bracket. This causes mounting and dismounting to be complicated and difficult. In addition, when the table leg is not in use, the single piece or unitary design of the table leg 50 is bulky, making the table leg difficult to stow or store when a user of the table is not using the table and desires more space. Furthermore, the height of the table is not readily adjustable to a variety of heights that may be needed or desired, depending on the height of the user and the particular desired use of the table. For example, it may be desirable to use the table as a coffee table, a worktable, a dining table or a bar table, and each of these uses requires a different height of the tabletop. With the existing design, only a single height is possible once that table leg is mounted to the bracket. If multiple height configurations are desired or needed, multiple table legs would need to be purchases or multiple brackets mounted at different heights. This would require a user of the table leg to drill holes and mount brackets in multiple locations at multiple heights of non-horizontal surfaces.

Embodiments of the disclosure provide a side mount table leg assembly that is fully adjustable in height and to a variety of horizontal and vertical positions. One or more embodiments provides a table leg assembly that also is configured to provide a tilted table with respect to a horizontal standing surface. According to one or more embodiments, a single table leg assembly can be used in a variety of locations and for a variety of functions in a micro home (a home that it less than 400 square feet in living area) or on a vehicle such as a motor home, a conversion van, or a boat. The table leg assembly is configurable for multiple uses and multiple heights, according to a user's needs. In addition, because the table leg assembly comprises two separate connected legs, the table leg assembly is configured to be folded and easily stowed and stored when the table is not in use or desired to be deployed. In one or more embodiments, a locking pin is configured to allow the table leg to be readily mounted and dismounted from a side mount bracket. The locking pin, which can be spring-loaded engages a receiving slot in the side mount bracket, enabling a user to mount or dismount the table using a single hand.

Referring now to FIGS. 2-7A-D, embodiments of the disclosure pertain to a side mount table leg assembly 100 as shown in FIGS. 2-6A-B and a side mount table assembly including the side mount table assembly shown in FIGS. 7A-D.

Referring now to FIGS. 2-6A-B, an exemplary embodiment of a side mount table leg assembly 100 is shown as comprising a lower leg 102 comprising a first pivotally connectable end 102a, the first pivotally connectable end 102a connected as shown in FIGS. 3A-B and 4A-B to a side mount adapter 106 by a first pivotable connection 113a. The lower leg 102 further comprises a second pivotally connectable end 102b connected by a second pivotable connection 113b to a first pivotally connectable end 104a of an upper leg 104. A second end 104b of the upper leg 104 is connectable to a bottom surface 232 of a table 230 (as shown in FIG. 7D). The side mount table leg assembly 100 further comprises a mounting bracket 150 (shown in FIG. 5) attachable to a non-horizontal surface. In the embodiment shown, the side mount adapter 106 is configured to be slidably and removably engaged with the mounting bracket 150. The first pivotable connection 113a and the second pivotable connection 113B are configured to permit the second end 104b of the upper leg 104 to be adjusted from a first, fully extended height (as shown in FIG. 7B), to a plurality of intermediate heights (shown in FIGS. 7A-D), and a lower height (shown in FIG. 7C). When the second end 104b of the upper leg is attached to a table 230 ash shown in FIGS. 7A-D, the table leg assembly is configured to deploy a table assembly in a variety of heights and configurations.

Figure 7A:
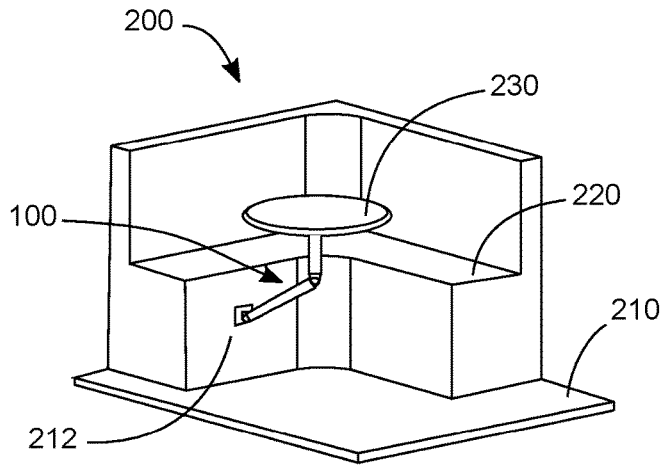
FIG. 7A is an isometric view of a side mount table leg assembly with a table and the table leg assembly mounted to a non-horizontal surface and the table positioned at a dining height.
Figure 7B:
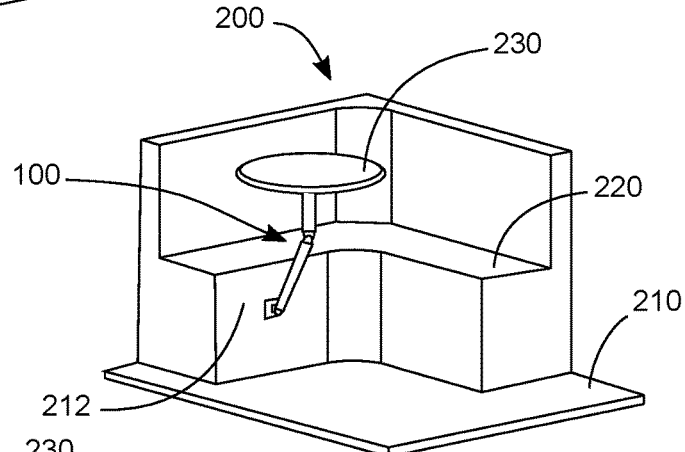
FIG. 7B is an isometric view of a side mount table leg assembly with a table and the table leg assembly mounted to a non-horizontal surface and the table positioned at a bar height or standing height.
Figure 7C:
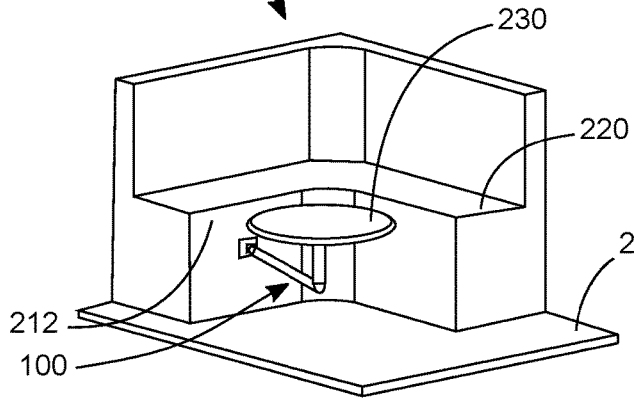
FIG. 7C is an isometric view of a side mount table leg assembly with a table and the table leg assembly mounted to a non-horizontal surface and the table positioned at a coffee table height.

In some embodiments, the side mount table leg assembly 100 at the lower height as shown in FIG. 7C, the second end 104b of the upper leg 104 is at a distance in a range of from about 14 inches to about 22 inches from a horizontal standing surface 210. In FIGS. 7A-D, the horizontal standing surface 210 is the deck of boat that passengers of the boat stand on. As shown in FIG. 7A and FIG. 7D, at the plurality of intermediate heights the second end 104B of the upper leg 104 is at a distance in a range of from greater than 22 inches and less than 40 inches from the horizontal standing surface 210. As shown in FIG. 7C, at the first fully extended height, the second end 104B of the upper leg 104 is at a distance in a range of from greater than 40 inches and less than 50 inches from the horizontal standing surface 210.

In non-limiting embodiments, as shown in FIG. the lower leg 102 has a length L1 that is longer than a length L2 of the upper leg 104. In non-limiting embodiments, the lower leg 102 has a length L1 in a range of from 10 inches to 48 inches, 12-40 inches 13-30 inches, or 14-20 inches and the upper leg 104 has a length L2 in a range of from 2 inches to 24 inches, 3-20 inches, 4-18 inches, 5-15 inches or 6-12 inches.

In one or more embodiments, the side mount table leg assembly 100, each of the first pivotable connection 113a and the second pivotable connection 113 comprises locking feature, shown as a rotatable knob 108a, 108b configured to loosen the respective first pivotable connection 113a and the second pivotable connection 113b to allow the side mount table leg to be raised and lowered. The locking feature is not limited to the rotatable knob as shown, and the locking feature in some embodiments comprises slide lock or a cam lock or any other suitable locking feature to hold the parts together. In one or more embodiments, the each of the rotatable knobs 108a, 108b of the first pivotable connection 113a and the second pivotable connection 113b are configured to rotatably adjust an angular position of the upper leg 104 and the lower leg 102 in one degree increments.

Figure 2:
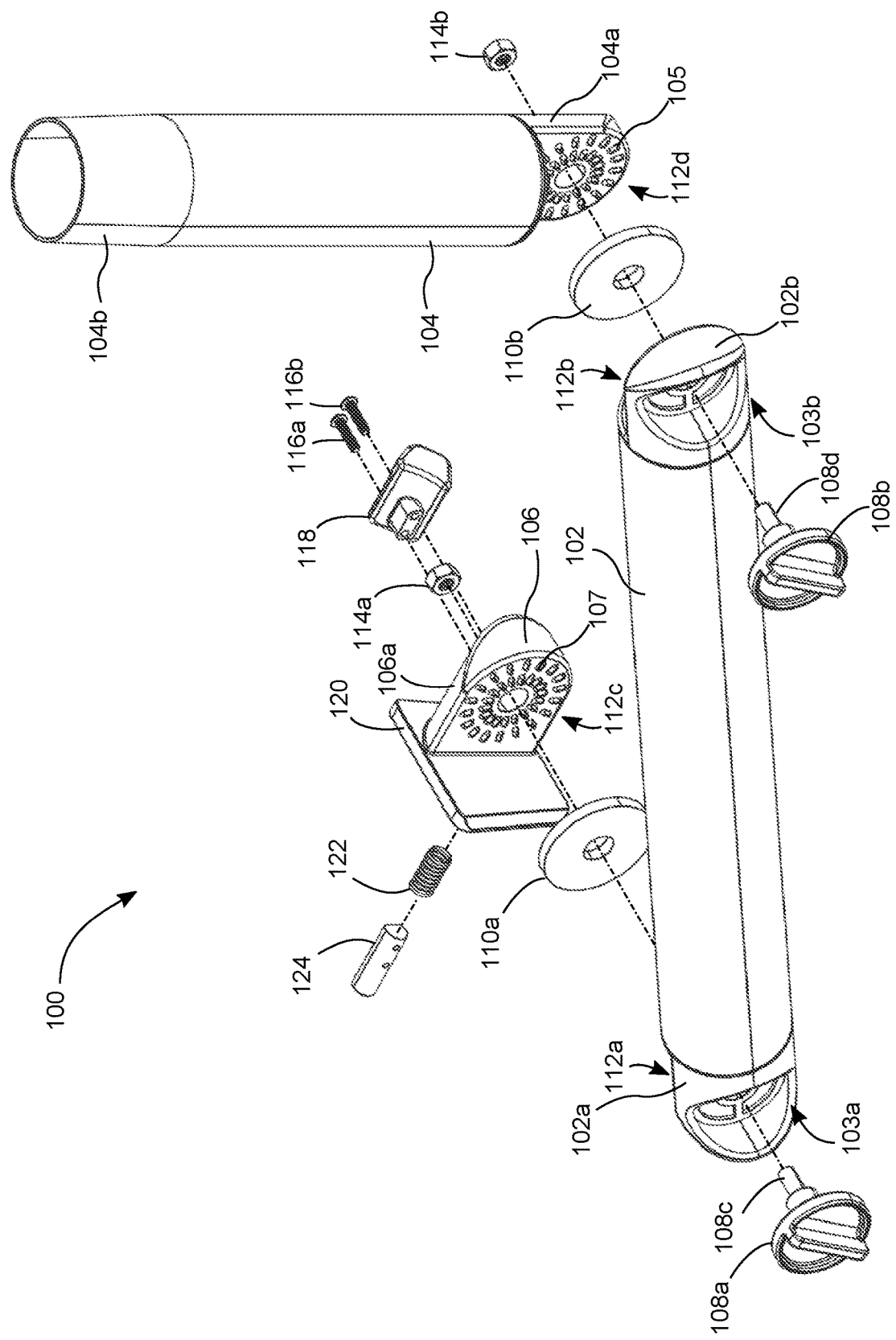
FIG. 2 is an exploded isometric view of a side mount table leg assembly according to an embodiment of the disclosure.

In one or more embodiments, the first pivotable connection 113a comprising the side mount adapter 106 includes a mounting leg 106a including a first face 112c engageable with a face 112a of the first pivotally connectable end 102a of the lower leg 102. As shown in FIG. 2, the first face 112c comprises a plurality of ribs 107 arranged in a coaxial radial pattern on the first face 112c of the mounting leg 106a of the side mount adapter. In the embodiment shown, the plurality of ribs 107 are arranged as two concentric circles, however, this arrangement is not limiting. As will be understood from the disclosure, the number and arrangement of the ribs 107 can be provided that is configured to allow incremental angular adjustment of the position of the lower leg 102 with respect to a non-horizontal or a horizontal surface. While not shown in the Figures, in some embodiments, the face 112a of the first pivotally connectable end 102a of the lower leg 102 can also comprise a plurality of ribs in a similar arrangement to the ribs 107 on the first face 112c on the side mount adapter.

Still referring to FIG. 2, in one or more embodiments, the second pivotable connection 113b comprises the second pivotally connectable end 102b of the lower leg 102 which includes a second face 112b engageable with a face 112d of the first pivotally connectable end 104a of the upper leg 104.

Figure 5:
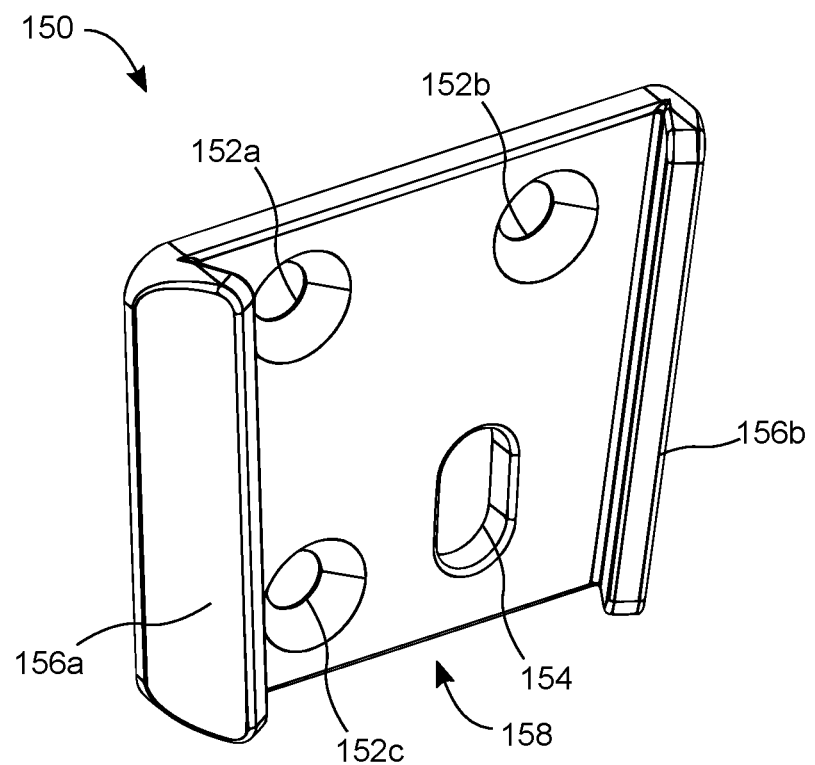
FIG. 5 is a side isometric view of a mounting bracket for a side mount table leg assembly according to an embodiment of the disclosure.

In one or more embodiments, the side mount adapter 160 comprising an angled plate 120 configured to be slidably engaged with an angled receiving pocket 158 extending from the mounting bracket 150 shown in FIG. 5. As best shown in FIG. 5, the mounting bracket 150, which is mountable to a non-horizontal surface, includes a first angled rail 156a and a second angled rail 156b spaced apart to provide the angled receiving pocket 158. In the embodiment shown, the angled receiving pocket 158 is in the shape of a trapezoid, with the first angled rail 156a and the second angled rail 156b defining non-parallel legs of the trapezoid. The angled plate 120 of the side mount adapter 160 also has the shape of a trapezoid that is complementary in shape to the shape of the angled receiving pocket 158. The angled plate 120 also comprises a first beveled edge 157a and a second beveled edge 157b that slidably engage first angled rail 156a and the second angled rail 156b defining the receiving pocket 158.

The mounting bracket 150 shown in FIG. 5 further includes mounting apertures 152a, 152b, and 152c that are sized, shaped and configured to receive fasteners, for example, screws or bolts that are used to affix the mounting bracket 150 to a non-horizontal surface 212, such as a wall, a coaming or a non-horizontal surface 212 extending from the deck of a boat, as shown in FIGS. 7A-D. In one or more embodiments, the apertures 152a, 152b and 152c are circular in shape.

In one or more embodiments, the first pivotable connection 113a further comprises a first friction washer 110a between the first face 112c of the mounting leg 106a and the face 112a of the first pivotally connectable end 102a of the lower leg 102. The second pivotable connection 113b further comprises a second friction washer 110b between the second face 112b of the second pivotally connectable end 102b of the lower leg 102 and the face 112d of first pivotally connectable end 104a of the upper leg 104. While not shown in the drawings, the face 112a and the second face 112b of some embodiments, each includes ribs similar to the ribs 107 and ribs 105. The ribs of the face 112a and the second face 112b can be in the same pattern as the ribs 107 and the ribs 105.

In one or more embodiments. the first friction washer 110a and the second friction washer 110b each comprise a polymer, for example, rubber, which can be a natural rubber or a synthetic rubber, for example, neoprene. In one or more embodiments, the first friction washer 110a and the second friction washer 110b each have a hardness in a range of from about 60 to about 100 shore durometer, for example 70-90 shore durometer. With reference to FIG. 2, the rotatable knob 108a includes a threaded end 108, and the rotatable knob 108b includes a threaded end 108d. The threaded end 108c is inserted through an aperture in the first pivotally connectable end 102a of the lower leg, the first friction washer 110a and an aperture in the mounting leg 106a, which threadably engages a first nut 114a. Similarly, the threaded end 108*d* of the rotatable knob 108*b* is inserted through an aperture in the second pivotally connectable end 102*b* of the lower leg 102, the second friction washer 110*b* and an aperture in the first pivotally connectable end 104*a* of the upper end, which threadably engages a second nut 114*b*. Once the respective threaded ends 108*c*, 108*d* and the first nut 114*a* and the second nut 114*b* are threadably engaged, the respective rotatable knobs 108*a* and 108*b* can be tightened by rotating the respective rotatable knobs 108*a*, 108*b* in a manner to apply a force that sandwiches the respective first friction washer 110*a* and second friction washer 110*b* to hold the respective pivotable connections 113*a* and 113*b* so that the angle of the lower leg 102 and the upper leg 104 can be adjusted. It will be appreciated that the ribs 105, 107 and the friction washer 110*b* and 110*a* cooperate to hold the legs 102, 104 in a variety of angular positions so that the table can be raised and lowered as desired by a user of the table leg assembly 100. In one or more embodiments, the first pivotable connection 113*a* and second pivotable connection 113*b* each do not include a worm gear or gas shock springs.

In one or more embodiments, the second end 104*b* of the upper leg 104 is connectable to a bottom surface of a table by a friction fitting, for example, by sliding the second end 104*b* into a table mount such as the table mount 56 shown in FIG. 1 or any suitable table mount. Referring to FIG. 2, FIG. 3A, FIG. 3B and FIGS. 6A-B, the side mount adapter 106 includes a slidable locking pin 124 that is biased to engage a locking slot 154 in the mounting bracket 150. The locking slot 154 is elongate and in the shape of an oval. The slidable locking pin 152 is biased by a biasing spring 122 which urges the slidable locking pin 124 towards the locking slot. The slidable locking pin 152 of some embodiments is mounted to a pull lever 118, which can be fastened to the slidable locking pin by threaded fasteners 116*a*, 116*b* that engage threaded apertures in the slidable locking pin 124. The slidable locking pin 124 is configured to allow a user to mount and dismount the lower leg 102 and remove the table leg assembly 100 from the mounting bracket 150 without tools. In one or more embodiments, the upper leg 104 may also be mounted and dismounted from the table by a similar slidable locking pin arrangement as the locking pin 124 shown and described here.

It will be appreciated that the table leg assembly 100 is configured to be folded at the second pivotable 113*b* connection to facilitate storage of the table leg assembly. In use, a user of the table leg assembly slidably moves the angled plate 120 in the direction of arrow 155 shown in FIG. 6A to engage the angled plate 120 with the mounting bracket 150. The lower leg 102 is attached to the side mount adapter by the first pivotable connection 113*a*, and the lower leg 102 is attached to the second pivotable connection 113*b*. By loosening the rotatable knobs 108*a* and 108*b*, the table leg assembly can be adjusted to a nearly infinite number of heights and positions, several of which are shown in FIGS. 7A-D. Once the angled plate 120 is engaged with the mounting bracket, a user can engage the slidable locking pin 124 by sliding the pull lever 118 away from the mounting bracket and then releasing the pull lever 118 (shown by arrow 156 in FIG. 6B) to allow the slidable locking pin 124 which is biased by the biasing spring to engage the locking slot 154 of the mounting bracket 150. To remove the table, a user can simply pull the pull lever 118 away from the mounting bracket 150, causing the slidable locking pin 124 to disengage from the locking slot 154, and allowing a user to lift the table assembly 200 out of the mounting bracket.

Storage and stowage of the table leg assembly 100 requires much less space than existing table leg assemblies. This is because a user can fold the upper leg 104 and the lower leg 102 towards each other, and the table leg assembly 100 can be stored in a small space such as a cabinet or a bin on a recreational vehicle or a boat. The ease of removal of the table leg assembly 100 from the mounting bracket 150 allows the table leg assembly 100 to be moved to a variety of locations. A user can purchase additional mounting brackets 150, and mount the brackets in various locations in a boat, permitting the user to have a versatile table that could be used in a dining area, on a swimming deck in a workspace or in the bow area of a boat. Raising and lower of the table is simple, convenient and fast, facilitated by the pivotable connections 113*a* and 113*b* including the rotatable knobs 108*a*, 108*b*, the friction washers 110*a*, 110*b* and the nuts 114*a*, 114*b*. A user can not only mount and dismount the table assembly 200 and table leg assembly 100 without using any tools, and the user also can adjust the height to a variety of heights to provide a variety of uses without any tools.

Another aspect of the disclosure pertains to method of using a table assembly, for example, the table assembly 200 shown in FIGS. 7A-D. In one or more embodiments, the table assembly 200 includes a table leg assembly 100. In specific embodiments, the table assembly comprises a single table 230 and a single table leg assembly 100 mounted to the table 230, and there is only one table leg assembly 100. The method comprises in one or more embodiments slidably engaging the side mount adapter 106 connected to the first pivotally connectable end 103*a* of the lower leg 102 of the table leg assembly 100 by the first pivotable connection 113*a* with mounting bracket 150. The method further comprises pivoting the second pivotable connection 113*b* connecting the second pivotally connectable end 102*b* of the lower leg 102 to the first pivotally connectable end 104*a* of the upper leg 104 to adjust a height of the table 230 connected to a second end 104*b* of the upper leg to allow a user of the table assembly 200 to use the table 230 as a coffee table, a dining table, a worktable and a bar table, as shown in FIGS. 7A-D.

The method of some embodiments further comprises adjusting an angular position of one or more the first pivotable connection 113*a* and the second pivotable connection 113*b* to adjust the height and angle of the table 230.

Some embodiments further comprise mounting the table assembly 200 to a mounting bracket 150 by sliding an angled plate 120 configured to be slidably engaged with the angled receiving pocket 168 extending from the mounting bracket 150 and slidably engaging the locking pin 124 with the mounting bracket 150.

Referring now to FIGS. 8-15, alternative embodiments of a table leg and table assembly are shown wherein the upper leg and the lower leg are joined together at various angles by a rotatable gear plate. By replacing the plurality of ribs 107 and the first friction washer 110*a* with a first plurality of gear teeth, which may be fixed to a first pivotally connectable end of the upper leg, or may be part of a rotatable gear plate. The first plurality of gear teeth is configured to engage or mesh with a fourth plurality of gear teeth on a second pivotally connectable end of the lower leg. By replacing the plurality of ribs 105 and the second friction washer 110*b* with a second plurality of gear teeth, which may be fixed to a side mount adapter, or may be part of a rotatable gear plate. The second plurality of gear teeth is configured to engage or mesh with a third plurality of gear teeth on a first pivotally connectable end of the lower leg. By utilizing the engaged plurality of gear teeth on the upper and lower legs the table leg assembly is configured to support heavier weights of 100 pounds and greater, and the pivotable connection can support the heavier weights without risk of the table inadvertently moving when a heavier load in excess of 100 pounds is placed on the table. In addition, the arrangement of the plurality of gear teeth is selected so that the table surface is configured to be adjusted to be parallel to the deck of a boat. The available mounting surfaces on many boats are either perpendicular to the deck, have a draft (angle) of 3 degrees from the plane perpendicular to the deck, or a 12 degree draft (angle) from the plane perpendicular to the deck. As there are a number of boats that have a 3 degree draft to the sides of the boat or on in the swim platform seats a severe slope then table leg assembly needs to be adjustable to accommodates for these various draft angles. By simply rotating this geared plate, the system can be adjusted from by −3, 0 and +3 angles. Accordingly, a gear teeth assembly configured for adjustment to these various angles so that the table surface is parallel to the deck and not tilted with respect to the deck surface. However, it will be understood that the disclosure is not limited to these angles.

According to one or more embodiments, the first plurality of gear teeth 307d (in the embodiment shown on the rotatable gear plate shown and described with respect to the embodiments of FIGS. 8-15), avoids having to provide gear teeth spaced at smaller increments, e.g., 3 degrees, to accommodate the surface mount draft angle on a variety of boats. The manufacture of such a plurality of gear teeth spaced at 3 degrees could require the teeth to be extremely small in size. In addition, because the gear teeth would be made from metal, the gear teeth would be difficult to cast via a lost wax casting process. However, as shown according to one or more embodiments, a plurality of gear teeth comprising angular adjustments of −3 degrees, 0 degrees and +3 degrees is provided by spacing the individual teeth by at least 3 degrees or greater, for example, at least 4 degrees, at least 5 degrees, at least 10 degrees, or at least 15 degrees, which results in structurally strong and robust teeth that are able to be cast easily and support a large amount of weight, for example, in excess of 100 pounds. It will be understood that the spacing of the individual gear teeth is exemplary only, and a range of angles could be used to space the individual gear teeth, for example, 3 degrees to 30 degrees, 4 degrees to 30 degrees, 5 degrees to 30 degrees, 3 degrees to 25 degrees, 4 degrees to 25 degrees, 5 degrees to 25 degrees, 3 degrees to 20, 4 degrees to 20 degrees, 5 degrees to 20 degrees, 10 degrees to 30 degrees, 10 degrees to 25 degrees, or 10 degrees to 20 degrees.

In the non-limiting embodiment shown including the rotatable gear plate, the gear teeth spacing is configured to adjust the angle of tilt of a table mounted to the table leg assembly in 3 degree increments relative to a horizontal plane, such as the deck of a boat. Because there are a variety of boats that have table mounting surfaces at 3 degree and 12 degree draft angles, a geared plate system that is configured to be adjusted in 15 degree increments will provide a table leg assembly that is configured to be level regardless of the draft angle of the mounting surface (e.g., (0 degrees 3 degrees, or 12 degrees). As used herein, "draft angle" refers to the angle defined by a plane perpendicular to the deck surface of a boat and a plane parallel to a mounting surface of a boat (as shown in FIGS. 7A-D and FIGS. 8, 9 and 10A-B). Thus, as shown in FIG. 10, the draft angle between perpendicular surface 311 and mounting surface 352a is 0 degrees, and in FIG. 10B, the draft angle between perpendicular surface 311 and mounting surface 352b is 3 degrees. While not specifically shown in a side view, the draft angle in FIG. 8 between mounting surface 352c and perpendicular surface 311 is 12 degrees.

When the table leg assembly adjusted from a lower height (e.g., a coffee table height) to an intermediate height (e.g., to a dining table height) and to a maximum height (e.g., to a bar table height), a table top mounted to the table leg assembly will remain parallel to the deck of the boat. The rotatable gear plate according to the non-limiting embodiments of the disclosure is configured to maintain the table top parallel to the deck of the boat at draft angles of 0 degrees, 3 degrees and 12 degrees. By simply rotating the geared plate, the table leg assembly can be adjusted so that the table top can be adjusted from by −3, 0 and +3 angles to allow tables to accommodate a large majority of table mounting surfaces on boats. It will be understood that if a rotatable gear plate is not used, adjustments could be made in other ways.

First referring to FIGS. 8, 9 and 10A-B, a first table assembly 300a, a second table assembly 300b, and a third table assembly 300c are shown respectively mounted to non-horizontal mounting surfaces 352a, 352b and 352c. Non-horizontal mounting surface 352a is perpendicular (or 90 degrees) to a horizontal plane 310 that is parallel to a horizontal standing surface, such as the horizontal standing surface 210 shown in FIGS. 7A-D. Non-horizontal mounting surface 352b has a 3 degree draft angle, or is 87 degrees with respect to a horizontal plane 310 that is parallel to a horizontal standing surface, such as the horizontal standing surface 210 shown in FIGS. 7A-D. As shown in FIG. 10A, the table is parallel with the horizontal plane 310, but in FIG. 101B, the table is offset 3 degrees from the horizontal plane 310. Non-horizontal mounting surface 352c has a 12 degree draft angle, or is 78 degrees with respect to a horizontal plane 310 that is parallel to a horizontal standing surface, such as the horizontal standing surface 210 shown in FIGS. 7A-D. While a cross-section view is not shown for table assembly 300c, the table of table assembly 300c can be leveled to be parallel with the horizontal plane by adjusting the rotatable gear plate 15 degrees to correct a 3 degree offset of the table. The non-horizontal mounting surfaces 352a, 352b and 352c according to one or more embodiments comprise a wall, a coaming or any other non-horizontal surface extending from the deck of a boat, as shown in FIGS. 7A-D.

Referring now to FIGS. 11-15, details of the table leg assembly 300 are shown. Note that certain specific details of the slidable locking pin the locking slot 154, the mounting bracket 150 and the pull lever 118 shown with respect to FIGS. 2 through 6A-B are similar or the same in embodiment shown in FIGS. 11-15.

Figure 6A:
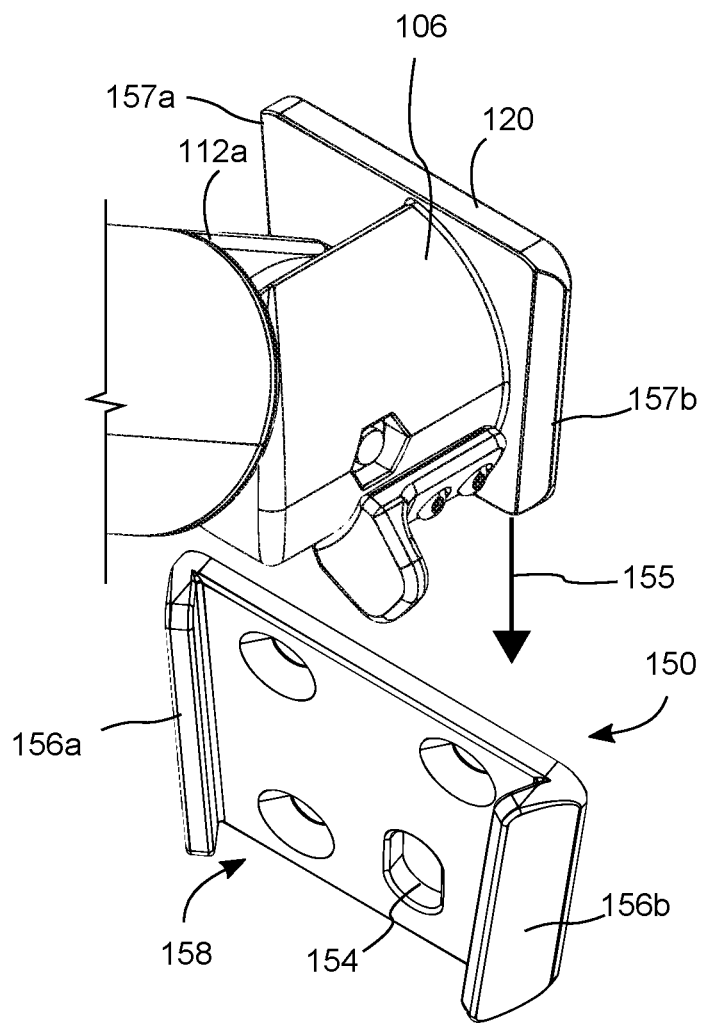
FIG. 6A is a side isometric view showing the side mount adapter of the side mount table let assembly in a position to be mounted to a mounting bracket.
Figure 6B:
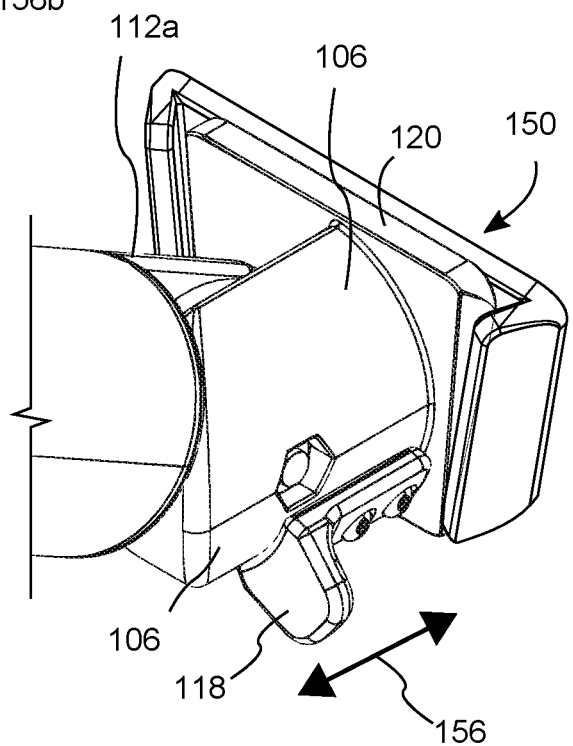
FIG. 6B is a side isometric view showing the side mount adapter of the side mount table let assembly shown in FIG. 6A mounted to a mounting bracket.
Figure 7D:
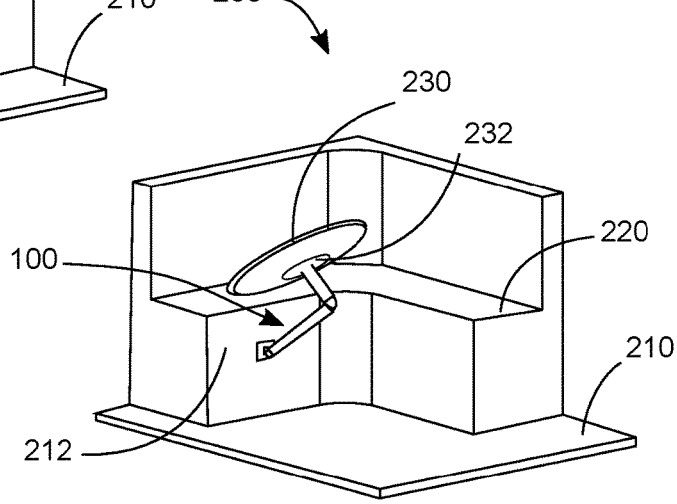
FIG. 7D is an isometric view of a side mount table leg assembly with a table and the table leg assembly mounted to a non-horizontal surface and the table positioned at a worktable height and the table positioned at an angle with respect to the horizontal standing surface.

An exemplary embodiment of a side mount table leg assembly 300 is shown as comprising a lower leg 302 comprising a first pivotally connectable end 302a, the first pivotally connectable end 302a connected as shown in FIGS. 5 and 6A-B to a side mount adapter 306 by a first pivotable connection 303a. The lower leg 302 further comprises a second pivotally connectable end 302b connected by a second pivotable connection 303b to a first pivotally connectable end 304a of an upper leg 304. A second end 304b of the upper leg 304 is connectable to a bottom surface 232 of a table 230 (as shown in FIG. 7D). The side mount table leg assembly 300 further comprises a mounting bracket 350 (similar to the mounting bracket 150 shown in FIG. 5) attachable to a non-horizontal surface. In the embodiment shown, the side mount adapter 106 is configured to be slidably and removably engaged with the mounting bracket 350. The first pivotable connection 303a and the second pivotable connection 303b are configured to permit the second end 304b of the upper leg 304 to be adjusted from a first, fully extended height (as shown in FIG. 7B), to a plurality of intermediate heights (shown in FIGS. 7A-D), and a lower height (shown in FIG. 7C). When the second end 304b of the upper leg is attached to a table 230 as shown in FIGS. 7A-D, the table leg assembly is configured to deploy a table assembly in a variety of heights and configurations.

In some embodiments, the side mount table leg assembly 300 at the lower height as shown in FIG. 7C, the second end 304b of the upper leg 304 is at a distance in a range of from about 14 inches to about 22 inches from a horizontal standing surface 210. In FIGS. 7A-D, the horizontal standing surface 210 is the deck of boat that passengers of the boat stand on. As shown in FIG. 7A and FIG. 7D, at the plurality of intermediate heights the second end 104B of the upper leg 304 is at a distance in a range of from greater than 22 inches and less than 40 inches from the horizontal standing surface 210. As shown in FIG. 7C, at the first fully extended height, the second end 304B of the upper leg 304 is at a distance in a range of from greater than 40 inches and less than 50 inches from the horizontal standing surface 210.

In non-limiting embodiments, similar to the embodiment shown in FIG. 4A, the lower leg 302 has a length L1 that is longer than a length L2 of the upper leg 304. In non-limiting embodiments, the lower leg 302 has a length L1 in a range of from 10 inches to 48 inches, 12-40 inches 13-30 inches, or 14-20 inches and the upper leg 104 has a length L2 in a range of from 2 inches to 24 inches, 3-20 inches, 4-18 inches, 5-15 inches or 6-12 inches.

In one or more embodiments, the side mount table leg assembly 300, each of the first pivotable connection 303a and the second pivotable connection 303 comprises a locking features such as a rotatable knob 308a, 308b configured to loosen the respective first pivotable connection 313a and the second pivotable connection 303b to allow the side mount table leg assembly 300 to be raised and lowered. In one or more embodiments, each of the rotatable knobs 308a, 308b of the first pivotable connection 303a and the second pivotable connection 303b are configured to rotatably adjust an angular position of the upper leg 304 and the lower leg 302 in fifteen degree increments. The locking feature is not limited to the rotatable knob as shown, and the locking feature in some embodiments comprises slide lock or a cam lock or any other suitable locking feature to hold the parts together.

Figure 11:
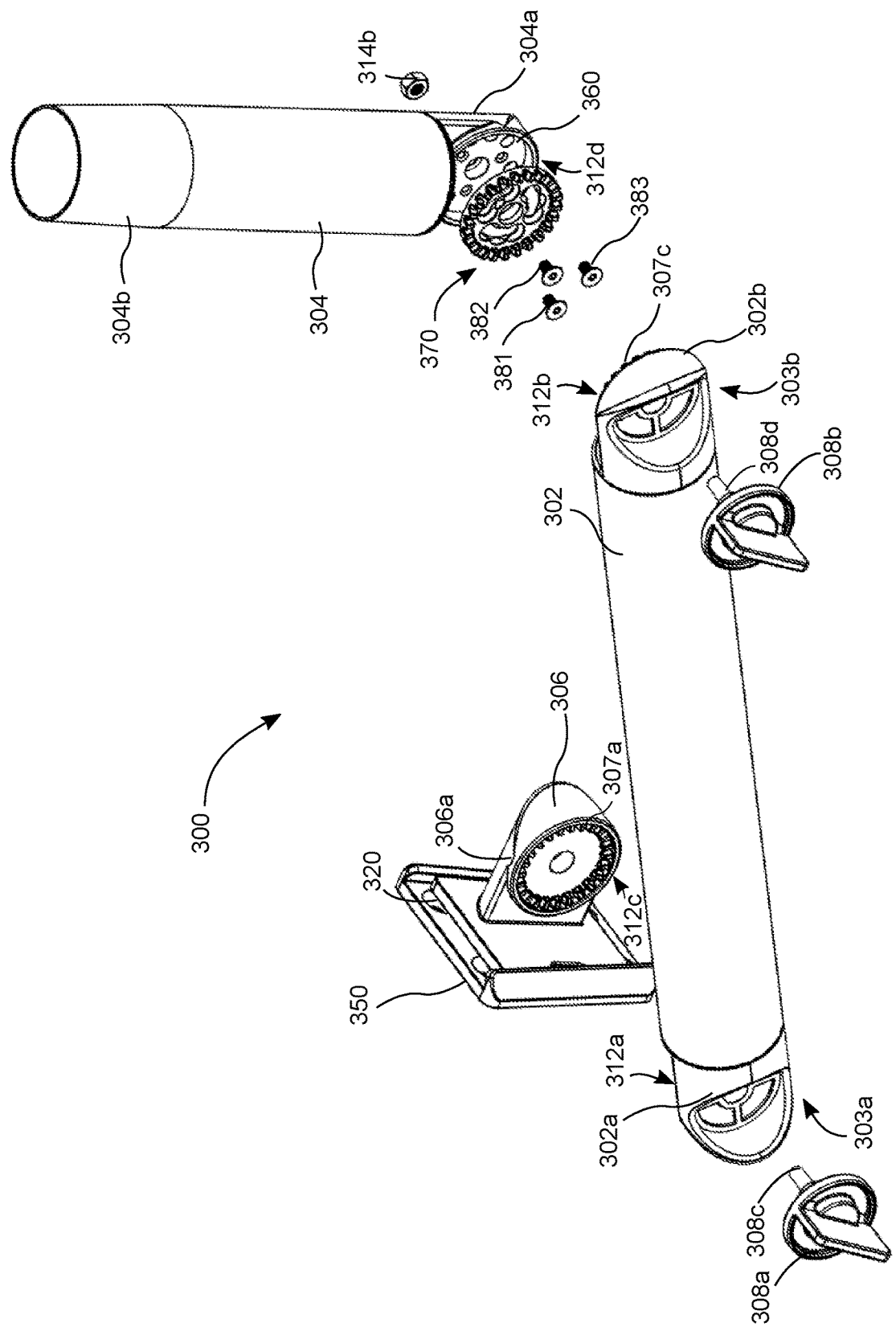
FIG. 11 is an exploded view of a table leg assembly according to an alternative embodiment.
Figure 14A:
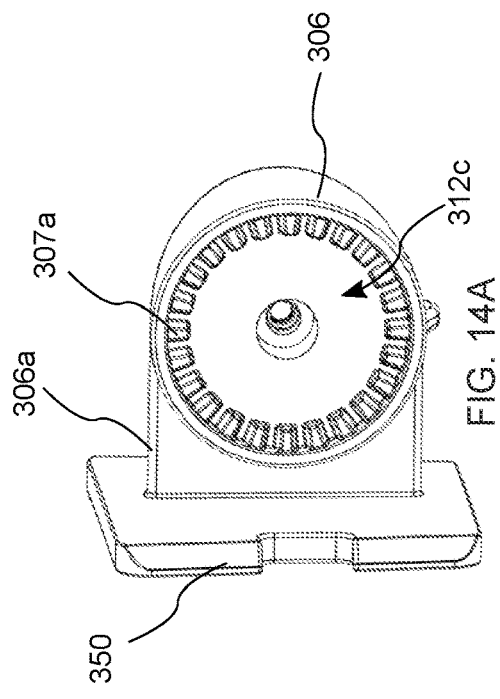
FIG. 14A is a side view of a side mount adapter engageable with the first pivotally connectable end of the lower leg of the table leg assembly shown in FIG. 11.
Figure 14B:
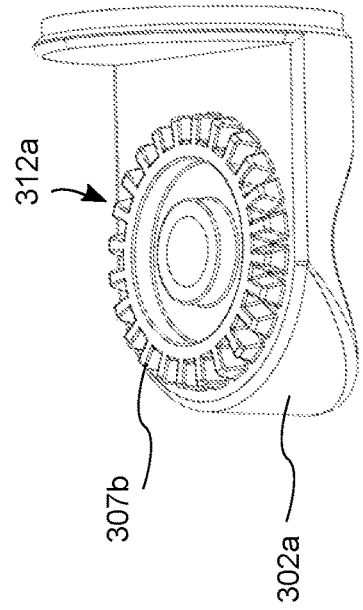
FIG. 14B is a top perspective view of the first pivotally connectable end of the lower leg of the table leg assembly shown in FIG. 11.
Figure 13:
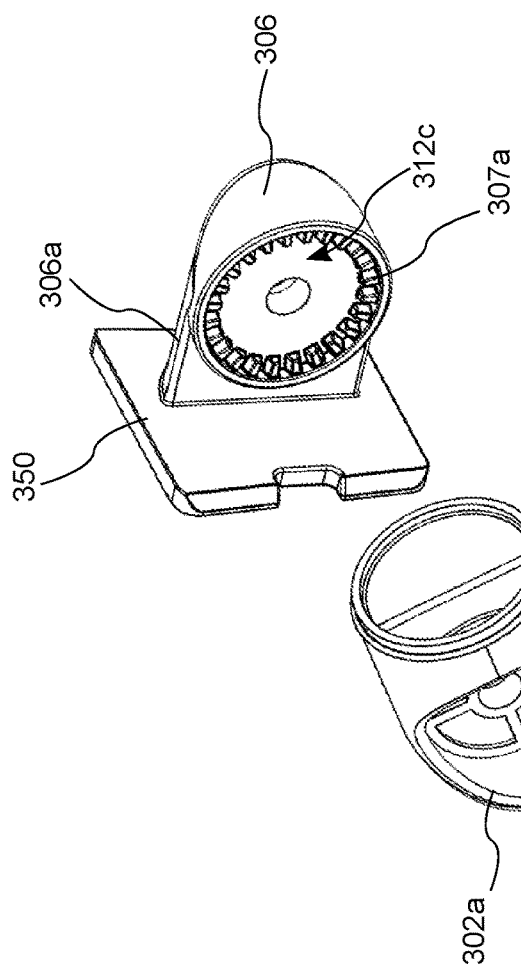
FIG. 13 is a perspective view of a side mount adapter engageable with the first pivotally connectable end of the lower leg of the table leg assembly shown in FIG. 11.

In one or more embodiments, similar to the embodiment shown in FIG. 2, the first pivotable connection 303a comprising the side mount adapter 306 includes a mounting leg 306a including a first face 312c engageable with a face 312a of the first pivotally connectable end 302a of the lower leg 302. As shown in FIG. 11, the first face 312c comprises a second plurality of gear teeth 307a arranged in a radial pattern on the first face 312c of the mounting leg 306a of the side mount adapter 306. In the embodiment shown, the second plurality of gear teeth 307a are arranged to engage a third plurality of gear teeth 307b on the face 312a of the first pivotally connectable end 302a of the lower leg 302.

Still referring to FIG. 11, in one or more embodiments, the second pivotable connection 303b comprises the second pivotally connectable end 302b of the lower leg 302 which includes a second face 312b engageable with a face 312d of the first pivotally connectable end 304a of the upper leg 304. As shown in FIG. 11, the second face 312b comprises a fourth plurality of gear teeth 307c arranged in a radial pattern on the second face 312b. In the embodiment shown, the fourth plurality of gear teeth 307c are arranged to engage a first plurality of gear teeth 307d on the face 312d of the first pivotally connectable end 304a of the upper leg 304.

In one or more embodiments, the side mount adapter 306 comprises an angled plate 320 configured to be slidably engaged with an angled receiving pocket (similar to the arrangement shown in FIG. 5) extending from the mounting bracket 350.

With reference to FIG. 11, the rotatable knob 308a includes a threaded end 308c, and the rotatable knob 308b includes a threaded end 308d. The threaded end 308c is inserted through an aperture in the first pivotally connectable end 302a of the lower leg 302 and an aperture in the mounting leg 306a, which threadably engages a first nut (not shown), similar to the first nut 114a shown in FIG. 2. Similarly, the threaded end 308d of the rotatable knob 308b is inserted through an aperture in the second pivotally connectable end 302b of the lower leg 302 and an aperture in the first pivotally connectable end 304a of the upper leg 304, which threadably engages a second nut 314b. Once the respective threaded ends 308c, 308d and the first nut and the second nut 314b are threadably engaged, the respective rotatable knobs 308a and 308b can be tightened by rotating the respective rotatable knobs 308a, 308b in a manner to apply a force that engages gear teeth to hold the respective pivotable connections 303a and 303b so that the angle of the lower leg 302 and the upper leg 304 can be held to a desired position. In one or more embodiments, the first pivotable connection 303a and second pivotable connection 303b each do not include a worm gear or gas shock springs.

In one or more embodiments, the second end 304b of the upper leg 304 is connectable to a bottom surface of a table by a friction fitting, for example, by sliding the second end 304b into a table mount such as the table mount 56 shown in FIG. 1 or any suitable table mount. The side mount adapter 306 shown in FIG. 11 includes a slidable locking pin and locking slot similar to the slidable locking pin 124, the locking slot 154 and the other components for mounting and securing the table leg assembly to a mounting surface as shown in FIG. 2, FIG. 3A, FIG. 3B and FIGS. 6A-B.

It will be appreciated that the table leg assembly 300 is configured to be folded at the second pivotable connection 303b to facilitate storage of the table leg assembly. In use, a user of the table leg assembly slidably moves the angled plate 320 as described above FIG. 6A The lower leg 302 is attached to the side mount adapter by the first pivotable connection 303a, and the lower leg 302 is attached to the second pivotable connection 303b. By loosening the rotatable knobs 108a and 108b, the table leg assembly can be adjusted to a number of heights and positions, several of which are shown in FIGS. 7A-D. Storage and stowage of the table leg assembly 300 requires much less space than existing table leg assemblies, as described above. A user can not only mount and dismount the table assembly and table leg assembly 300 without using any tools, and the user also can adjust the height to a variety of heights to provide a variety of uses without any tools.

Specifically referring to FIGS. 11, 13 and 14A-B, the side mount adapter 306 includes the second plurality of gear teeth 307a on the first face 312c of the side mount adapter 306 that are configured to engage or mesh with the third plurality of gear teeth 307b on the face 312a of the first pivotally connectable end 302a of the lower leg 302. In one or more embodiments, the second plurality of gear teeth 307a are arranged in a ring or circular pattern and extending from the first face 312c and the third plurality of gear teeth 307b are also arranged in a ring or a circular pattern and extending from the face 312a of the first pivotally connectable end 302a of the lower leg 302. The second plurality of gear teeth 307a and the third plurality of gear teeth 307b are shown to have a trapezoidal shape to facilitate engagement with each other. In the embodiment shown, the second plurality of gear teeth 307a and the third plurality of gear teeth 307b are spaced in 15 degree increments so that the second plurality of gear teeth 307a comprise twenty-four individual gear teeth, and the third plurality of gear teeth 307b comprise twenty-four individual gear teeth. This arrangement is configured to adjust the lower leg 302 in a variety of angular positions.

Specifically referring to FIGS. 11 and 12A-C, the second pivotally connectable end 302b of the lower leg 302 comprises a fourth plurality of gear teeth 307c on the second face 312b and extending outwardly from the second face 312b, similar to the second plurality of gear teeth 307a extending from the first face 312c of the first pivotally connectable end 302a. In the embodiment shown, the fourth plurality of gear teeth 307c comprise individual gear teeth that are spaced in 15 degree increments so that the fourth plurality of gear teeth 307c comprise twenty-four individual gear teeth.

The face 312d of the first pivotally connectable end 304a of the upper leg 304 includes a gear plate mount 360 which is configured to receive a rotatable gear plate 370, the rotatable gear plate 370 removably fastened to the gear plate mount 360 by a plurality of fasteners 381, 382, and 383. In one or more embodiments, the plurality of fasteners 381, 382, and 383 comprise bolts or screws, for example, flat head screws with machine threads. The plurality fasteners comprising a first fastener 381, a second fastener 382 and a third fastener 383 are respectively received by a plurality of threaded openings comprising a first threaded opening 381a, a second threaded opening 382a and a third threaded opening 383a in the gear plate mount 360, The rotatable gear plate 370 comprises a first plurality of gear teeth 307d extending from the rotatable gear plate 370, which are configured to engage or mesh with the fourth plurality of gear teeth 307c extending from the second face 312b of the second pivotally connectable end 302b of the lower leg 302.

The rotatable gear plate 370 further comprises a plurality of protrusions 391, 392 and 393 extending from a backside 390 of the rotatable gear plate 370. The plurality of protrusions 391, 392 and 393 are respectively configured to be received in a plurality of bores 391a, 391b, 391c, 392a, 392b, 392c, 393a, 393b and 393c in the gear plate mount as will be explained further below. The rotatable gear plate further comprises a plurality of fastener slots 371s, 372s and 373s. A first slot 371s comprises a first slot position 371a, a second slot position 371b and a third fastener slot position 371c. A second slot 372s comprises a first slot position 372a, a second slot position 372b and a third fastener slot position 372c. A third fastener slot 373s comprises a first slot position 373a, a second slot position 373b and a third fastener slot position 373c. The first slot position 371a of the first slot 371s corresponds to the first slot position 372a of the second slot 372s and the first slot position 373a of the third fastener slot 373s. Likewise, the second slot position 371b of the first slot 371s corresponds to the second slot position 372b of the second slot 372s and the second slot position 373b of the third fastener slot 373s. The third fastener slot position 371c of the first slot 371s corresponds to the third fastener slot position 372c of the second slot 372s and the third fastener slot position 373c of the third fastener slot 373s.

In use and according to a method of the present disclosure, the table leg assembly 300 is configured to be adjusted to provide a level table surface at a variety of table heights for table mounting surfaces having 0 degrees of draft angle, 3 degrees of draft angle or 12 degrees of draft angle by adjusting the position of the rotatable gear as follows. In a first position, the first fastener 381 is loosely threaded in threaded opening 381a, a second fastener 382 is loosely threaded in a second threaded opening 382a and a third fastener 383 is loosely threaded in a third threaded opening 383a. "Loosely threaded" refers to the fasteners being initially threaded into their respective threaded openings so that the rotatable gear plate 370 can be moved between the positions as further described below.

A first position (e.g. a draft angle of 0 degrees) is shown in FIG. 12 B, in which the first fastener 381 is in the second slot position 371b of the first slot 371s, the second fastener 382 is in the second slot position 372b of the second slot 372s and the third fastener 383 is in the second slot position 373b of the third fastener slot 373s. The first protrusion 391 is in the bore 391b, the second protrusion 392 is in the bore 392b and the third protrusion 393 is in the bore 393b. The fasteners 381, 382, 383 are tightened so long at the table is level with the horizontal plane or deck of the boat, causing the protrusions 391, 392, 393 to respectively engage with bores 391b, 392b and 393b and firmly hold the rotatable gear plate in a first angular position.

When the table leg assembly 300 is mounted to a mounting surface having a different draft angle (e.g. 3 degrees) that requires a 3 degree adjustment of the table height to make the table level with respect to the deck (a horizontal plane), the fasteners 381, 382, 383 are then loosened to allow the protrusions 391, 392, 393 to be removed from the respective bores 391b, 392b and 393b. The rotatable gear plate 370 is rotated clockwise to adjust the table 3 degrees in a first direction, and the protrusions 391, 392 and 393 are respectively positioned in bores 391a, 392a and 393a, while the fasteners 381, 382, 383 are respectively positioned in first slot position 371a of the first slot 371s, first slot position 372a of the second slot 372s and first slot position 373a of the third fastener slot 373s. The fasteners are then tightened, causing the protrusions 391, 392, 393 to engage the respective bores 391a, 392a and 393a to firmly hold the rotatable gear plate 370 in a second angular position.

When the table leg assembly 300 is moved to a different location and is mounted to a mounting surface having a different draft angle (e.g., 12 degrees) that requires a 3 degree adjustment in a different direction from the second direction, the fasteners 381, 382, 383 are loosened. To make the table level with respect to the deck (a horizontal plane), the protrusions 391, 392, 393 are removed from the respective bores 391a, 392a and 393a. The rotatable gear plate 370 is rotated counterclockwise to adjust the table 6 degrees in a second direction, and the protrusions 391, 392 and 393 are respectively position in bores 391c, 392c and 393c, while the fasteners 381, 382, 383 are respectively positioned in third fastener slot position 371c of the first slot 371s, third fastener slot position 372c of the second slot 372s and the third fastener slot position 373c of the third fastener slot 373s. The fasteners are then tightened, causing the protrusions 391, 392, 393 to engage the respective bores 391c, 392c and 393c to firmly hold the rotatable gear plate 370 in a third angular position.

Thus, according to one or more embodiments, by providing a rotatable geared plate in a table leg assembly, three distinct angular positions can be obtained, a first position at 0 degrees, a second position a −15 degrees and a third position at +15 degrees to adjust the table to be level with a horizontal surface of a boat, such as the boat deck in 3 degree increments when mounted to a mounting surface having draft angles of 3 degrees, 0 degrees and 12 degrees.

The three rotatable positions comprise a first rotatable position, a second rotatable position and a third rotatable position, wherein the second rotatable position is 15 degrees from the first rotatable position in a first direction and the third rotatable position is 15 degrees from the first position in second direction opposite the first direction Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A side mount table leg assembly comprising:
    a lower leg comprising a first pivotally connectable end, the first pivotally connectable end connected to a side mount adapter by a first pivotable connection, and a second pivotally connectable end connected by a second pivotable connection to a first pivotally connectable end of an upper leg, and a second end of the upper leg connectable to a bottom surface of a table;
    a mounting bracket attachable to a non-horizontal surface, the side mount adapter configured to be slidably and removably engaged with the mounting bracket, the first pivotable connection and the second pivotable connection configured to permit the second end of the upper leg to be adjusted from a first, fully extended height, to a plurality of intermediate heights, and a lower height;
    a first plurality of gear teeth configured to securely hold the table leg assembly in at least a first angular position and a second angular position; and
    wherein the first pivotable connection includes a mounting leg including a first face comprising a second plurality of gear teeth engageable with a face of the first pivotally connectable end of the lower leg comprising a third plurality of gear teeth.

2. The side mount table leg assembly of claim 1, wherein at the lower height, the second end of the upper leg is at a distance in a range of from about 14 inches to about 22 inches from a horizontal standing surface, at the plurality of intermediate heights the second end of the upper leg is at a distance in a range of from greater than 22 inches and less than 40 inches from the horizontal standing surface, and at the first fully extended height, the second end of the upper leg is at a distance in a range of from greater than 40 inches and less than 50 inches from the horizontal standing surface.

3. The side mount table leg assembly of claim 1, wherein the lower leg has a length that is longer than a length of the upper leg.

4. The side mount table leg assembly of claim 2, wherein the lower leg has a length in a range of from 10 inches to 48 inches and the upper leg has a length in a range of from 2 inches to 36 inches.

5. The side mount table leg assembly of claim 1, wherein each of the first pivotable connection and the second pivotable connection comprises a locking feature configured to loosen the first pivotable connection and the second pivotable connection to allow the side mount table leg to be raised and lowered.

6. The side mount table leg assembly of claim 5, wherein each of the locking features of the first pivotable connection and the second pivotable connection is configured to permit adjustment of an angular position of the upper leg and the lower leg in increments in a range of from 3 degrees to 30 degrees.

7. The side mount table leg assembly of claim 1, wherein the side mount adapter comprises an angled plate configured to be slidably engaged with an angled receiving pocket extending from the mounting bracket.

8. The side mount table leg assembly of claim 1, wherein the second pivotable connection comprises the second pivotally connectable end of the lower leg which includes a second face comprising a fourth plurality of gear teeth engageable with a face of the first pivotally connectable end of the upper leg comprising the first plurality of gear teeth.

9. The side mount table leg assembly of claim 8, wherein the second pivotable connection is configured to be moved into three rotatable positions.

10. The side mount table leg assembly of claim 9, wherein the three rotatable positions comprise a first rotatable position, a second rotatable position and a third rotatable position, wherein the second rotatable position is 15 degrees from the first rotatable position in a first direction and the third rotatable position is 15 degrees from the first position in second direction opposite the first direction.

11. The side mount table leg assembly of claim 10, wherein the first pivotally connectable end of the upper leg includes a gear plate mount, and the gear plate has a back side having a plurality of protrusions extending from the back side and configured to engage a plurality of bores in the gear plate.

12. The side mount table leg assembly of claim 11, wherein the gear plate further comprises a plurality of threaded openings configured to receive a plurality of fasteners.

13. The side mount table leg assembly of claim 12, wherein the rotatable gear plate comprises a plurality of slots, each of the plurality of slots comprising three slot positions configured to receive a plurality of fasteners.

14. The side mount table leg assembly of claim 13, wherein the rotatable gear plate is rotatable between the three slot positions of each of the plurality of slots.

15. The side mount table leg assembly of claim 14, wherein the plurality of bores comprises nine bores, and each of the plurality of protrusions is rotatable between the nine bores.

16. The side mount table leg assembly of claim 1, further comprising a slidable locking pin configured to slidably engage with the mounting bracket and lock the side mount table leg assembly to the mounting bracket.

17. The side mount table leg assembly of claim 16, wherein the slidable locking pin is configured to allow a user to mount and dismount the lower leg and to be removed from the mounting bracket without tools.

18. The side mount table leg assembly of claim 17, wherein the table leg assembly is configured to be folded at the second pivotable connection to facilitate storage of the table leg assembly.

19. A method of using the side mount table leg assembly of claim 1, the method comprising:
   slidably engaging the side mount adapter with the mounting bracket;
   pivoting the second pivotable connection to adjust a height of a table connected to the second end of the upper leg to allow a user of the table assembly to use the table as a coffee table, a dining table, a worktable and a bar table; and
   adjusting the table to be level with a deck of a boat by rotating plurality of gear teeth at the second pivotable connection.

20. The method of claim 19, further comprising adjusting an angular position of one or more the first pivotable connection and the second pivotable connection to adjust the height and angle of the table.

* * * * *